United States Patent
Vicard et al.

(10) Patent No.: US 6,294,139 B1
(45) Date of Patent: Sep. 25, 2001

(54) METHODS FOR WET CLEANING OR PURIFYING GASES OR FUMES TO REMOVE GASEOUS POLLUTANTS

(75) Inventors: Jean-Francois Vicard, Lyons; Bernard Siret, Villeurbanne; Laurent Guyot, Lyons, all of (FR)

(73) Assignee: Lab S.A., Lyons (FR)

( * ) Notice: Subject to any disclaimer, the term of this patent is extended or adjusted under 35 U.S.C. 154(b) by 0 days.

(21) Appl. No.: 09/405,004

(22) Filed: Sep. 27, 1999

Related U.S. Application Data

(63) Continuation of application No. 08/809,173, filed as application No. PCT/FR95/01200 on Sep. 19, 1995, now abandoned.

(30) Foreign Application Priority Data

Sep. 21, 1994 (FR) .................................................. 94 11474

(51) Int. Cl.[7] .............................. B01D 53/56; B01D 53/64
(52) U.S. Cl. ............................................. 423/210; 423/235
(58) Field of Search .................................. 423/210, 235, 423/243.01

(56) References Cited

U.S. PATENT DOCUMENTS

| | | | |
|---|---|---|---|
| 3,647,359 | * | 3/1972 | Bell ........................................ 23/2 R |
| 3,961,031 | * | 6/1976 | Yasui et al. ............................ 423/210 |
| 4,055,624 | * | 10/1977 | Yoshida et al. ........................ 423/235 |
| 5,063,034 | * | 11/1991 | Vicard .................................... 423/235 |
| 5,284,557 | * | 2/1994 | Ukawa et al. .......................... 204/130 |
| 5,639,434 | * | 6/1997 | Patrikainen et al. .................. 423/235 |

FOREIGN PATENT DOCUMENTS

| | | |
|---|---|---|
| 1 945 173 | * 8/1970 | (DE) . |
| 0 199 037 A3 | * 10/1986 | (EP) . |
| 0 487 834 A1 | * 6/1992 | (EP) . |
| 2 643 286 | * 8/1990 | (FR) . |
| 63-100918 A | * 5/1998 | (JP) . |

* cited by examiner

*Primary Examiner*—Steven P. Griffin
*Assistant Examiner*—Timothy C Vanoy
(74) *Attorney, Agent, or Firm*—Dowell & Dowell, P.C.

(57) ABSTRACT

Method for wet cleaning gases to remove low soluble pollutants such as mercury metal and nitrogen monoxide. An oxidizing agent is released from a compound such as a sodium chlorite, injected into a recycle stream being conveyed for dispensing into a scrubber, by a releasing agent, such as finely divided solids in the recycle stream, so that the oxidizing agent becomes available at the time of dispersion into the scrubber to oxidize the pollutants on the surface of droplets dispersed throughout the gases in the scrubber. The resulting oxidized pollutants have increased solubility and are transferred to a scrubbing liquid.

6 Claims, 1 Drawing Sheet

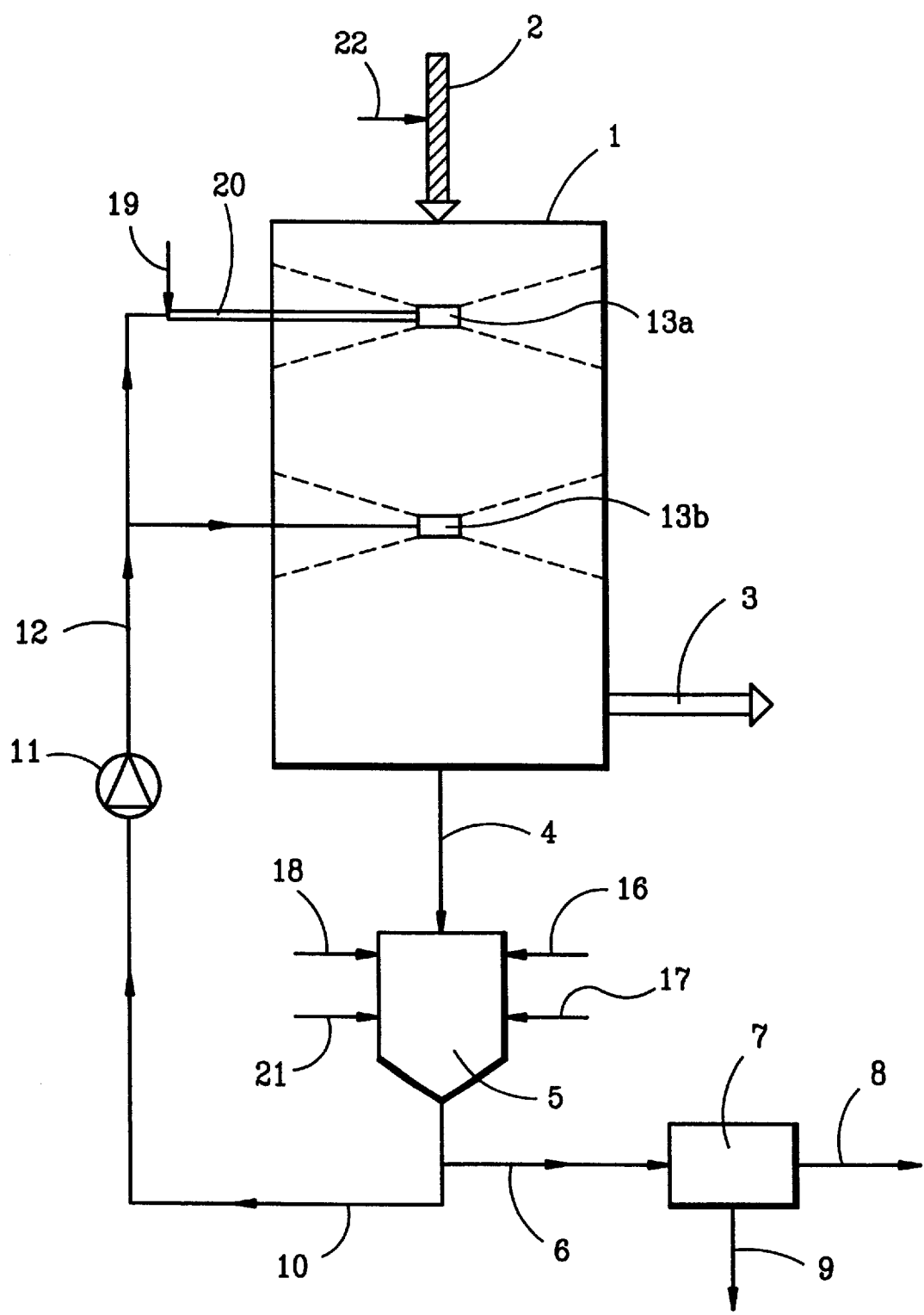

METHODS FOR WET CLEANING OR PURIFYING GASES OR FUMES TO REMOVE GASEOUS POLLUTANTS

CROSS-REFERENCE TO RELATED APPLICATIONS

This application is a continuation of application Ser. No. 08/809,173 filed Mar. 18, 1997, now abandoned, which is a 371 of International Application No. PCT/FR95/01200 filed Sep. 19, 1995.

BACKGROUND OF THE INVENTION

1. Field of the Invention

The present invention relates to the industrial processes emitting gases or fumes which must be cleaned or purified before being rejected to the atmosphere. It relates more particularly to methods for wet cleaning or purifying gases or fumes of gaseous pollutants and particularly barely soluble gaseous pollutants.

2. State of the Art

The majority of industrial processes emit fumes containing different pollutants in particle and/or gaseous form. For collecting the dust, a large number of techniques have been proposed and carried out: cyclone, dry electrofilter, bag filter, venturi scrubber, wet electrofilter, etc . . . For collecting gaseous pollutants, dry and wet techniques have been proposed and carried out. In the dry techniques, a finely divided solid is injected into the fumes to be purified. The gaseous pollutants are then collected by the particles of said solid either by chemical reaction (for example HCl reacting on particles of lime) or by adsorption (for example mercury adsorbed on active charcoal). The finely divided solid is then collected in a deduster, for example electrofilter or bag filter.

All these techniques are limited by the difficulties inherent in the gas/solid transfers and lead to an excess consumption of reagents. This is why wet techniques are often preferred, in particular when the concentration to be attained in the purified fumes is low. In the wet techniques, an intimate contact is made between the fumes and the scrubbing liquid and the gaseous pollutants are transferred in said scrubbing liquid where they are either simply dissolved in the case of very soluble gases (for example HCl in water) or "neutralized" in the case of barely soluble gases by physico-chemical reaction with a reagent dispersed in the scrubbing liquid; the "neutralization" would make it possible to continue dissolution of the gaseous pollutant in question despite its weak solubility (for example $SO_2$ "neutralized" in aqueous phase by lime or mercury "neutralized" by adsorption in aqueous phase on active charcoal). These wet techniques are generally more efficient than the dry techniques, but are also limited for example by the very weak solubilility of certain gaseous pollutants such as mercury metal or nitrogen monoxide. They are also limited by the conditions of collection imposed by the other, more soluble pollutants also present in the fumes to be purified. This is why it has been proposed to modify the chemical state of these gaseous pollutants, in gaseous phase, before collection of the pollutants. It has thus been proposed to inject sodium sulfide in the fumes which forms different sulfides with the pollutants present, particularly mercury sulfide with the mercury which is in particle form and may therefore be collected in a deduster placed downstream of the point of injection. The drawback of this method is due to the risk of release of hydrogen sulfide at the level of purification of the fumes or from the residues of purification of the fumes. Other methods have also been proposed to oxidize the nitrogen monoxide into nitrogen dioxide by injecting into the fumes different oxidizers such as chlorine dioxide, ozone, etc . . . After this step of oxidation in gaseous phase, the fumes are then purified by the wet method. These methods present the drawback of leading to a high consumption of reagents on the one hand due to the difficulty in mixing the oxidizer with a high fume flowrate, and on the other hand, by reason of the barely selective nature of the oxidation which may act for example on the sulfur dioxide very often present and which is more efficient and more economical to collect by other methods. In Patent FR-B-2 643 286, oxidation is effected more efficiently by injecting into the fumes, on the one hand, an easily soluble gaseous acid agent (for example HCl) and, on the other hand, downstream, by spraying, a scrubbing liquid containing an oxidation compound (for example $NaClO_2$) which, when the HCl is absorbed in the droplets of liquid, reacts with the $NaClO_2$ to generate upon contact with the droplets and fumes, an oxidizer, chlorine dioxide in the example in question. However, this method presents the drawback of necessitating a homogeneous mixture of the gaseous acid agent with a high fume flowrate upstream of the scrubber.

The present invention aims at overcoming these drawbacks while taking into account the requirements of an efficient multi-pollutant purification.

SUMMARY OF THE INVENTION

The present invention relates to a method for purifying fumes containing very barely or low soluble gaseous pollutants, in which the fumes are purified by wet method in a scrubber with one or more levels of devices for dispersion of the scrubbing liquid in the fumes to be purified, recycling of the scrubbing liquid, injection of acid or of neutralizer in the recycling tank to adjust the pH, and bleed for deconcentration of the pollutants collected, characterized in that:

a) an oxidation compound (19) is introduced at least in the scrubbing liquid sent into the dispersion device (13a) dispersing at the entrance of the scrubber said scrubbing liquid in the fumes to be purified;

b) the location of injection of the oxidation compound is determined so that the time the liquid takes to pass between said point of injection and said dispersion device makes it possible to release the oxidation compound with the aid of the releasing agent or agents contained in the scrubbing liquid;

c) the composition of the scrubbing liquid in releasing agents is maintained upstream of the point of injection of the oxidation agent.

The oxidized pollutants, which are much more soluble, may be transferred into a scrubbing liquid.

To render the method as efficient as possible, a preferred variant consists in "neutralizing" by a physico-chemical reaction the oxidized pollutants either in the scrubber itself when the requirements on the scrubbing liquid (particularly of pH) are similar for oxidation and neutralization, or in a second scrubber placed downstream when said requirements are not compatible.

To avoid an excess consumption of oxidation compounds in the presence of $SO_2$, the scrubbing liquid is most often maintained at an acid pH, preferably between 1.5 and 3.5.

BRIEF DESCRIPTION OF THE DRAWINGS

The invention will now be more readily understood on reading the following detailed description in connection with FIG. 1 which gives a schematic representation of the method forming the subject matter of the invention.

DESCRIPTION OF THE PREFERRED EMBODIMENT.

The fumes (2) to be purified are introduced in a scrubber (1) where they are contacted by the recycled scrubbing liquid (12) distributed in the gases by appropriate dispensing devices (13a) and (13b). The fumes emerge from the scrubber purified (3). The scrubbing liquid (12) introduced in the scrubber (1), after contact with the gases is recovered (4) in a tank (5) which may be arranged in the base of the scrubber (1). The composition of the fumes (2) to be purified is most often variable and the recovered scrubbing liquid (4) is at a variable pH. An addition of liquid acid agent (16) or an addition of neutralizing agent (17) may be made in the tank (5) so that the scrubbing liquid is maintained at a constant pH. The pH may be measured on the scrubbing liquid (4) or on liquid (10) or on liquid (12).

At the outlet of the tank (5), a small part or bleed of the liquid (6) is directed onto a treatment station (7). The pollutants collected and the reaction products are precipitated and separated in the form of solid residues (9) while the clear water (8) contains neutral salts which generally do not raise problems with respect to the natural medium.

The major part of the liquid (10) is sent towards the scrubber by a recycling pump (11), and the recycling liquid thus pressurized is again dispersed in the fumes to be purified by the appropriate devices (13a) and (13b). An addition of water (18) may be made in tank (5) in order to maintain the level of liquid in this tank constant and thus compensate for the water evaporated in the scrubber (1) to saturate the fumes in water vapour as well as the deconcentration bleed (6).

The above arrangements, known per se, are completed as follows to carry out the invention. The dispersion device (13a) placed at the entrance of the scrubber is supplied with pressurized scrubbing liquid (12) via a device (20) at the inlet of which is injected an oxidation compound. The device (13a) is the first dispersion device encountered by the fumes (2) to be purified when they enter the scrubber (1). This device (13a) may be usefully constituted by one spray placed at the center or a plurality of sprays located in the same plane. The oxidation compound may be usefully selected from potent oxidizers such as sodium chlorite, sodium hypochlorite, ozone. When such potent oxidizers are injected in the scrubbing liquid (12), their oxidizing action may be systematically triggered off if the scrubbing liquid (11) has an appropriate composition. This results in the production of gaseous oxidizing agent such as chlorine dioxide, nascent oxygen, etc . . . and the capacity of the device (20) is determined so that the time of passage of the liquid (11) between the injection (19) and the dispersion device (13a) makes it possible to release the oxidation compound (19). Tests have shown that this time could be less than 1 second. If the capacity of the device (20) is too great, the oxidizing agent would be very rapidly consumed by pollutants other than the pollutant or pollutants aimed at and already present in the scrubbing liquid such as the sulfites/bisulfites coming from the collection of $SO_2$ very often present in the fumes. The close injection and the controlled release make it possible to limit the consumption of oxidation compounds which are expensive, to avoid the secondary effects associated with an excess consumption of these products and, especially, to have available a gaseous oxidizing agent on the surface of the droplets dispersed in the fumes. This results in an efficient oxidation of the very barely or low soluble gaseous pollutants such as mercury metal or nitrogen monoxide; the mercury metal Hg (0) is transformed into Hg (II) and the nitrogen monoxide into nitrogen dioxide which are much more soluble and may be transferred in a scrubbing liquid. To render the method as efficient as possible, a preferred variant consists in "neutralizing" by a physico-chemical reaction the oxidized pollutants either in the scrubber itself with the aid of devices (13b) for dispersing the scrubbing liquid, when the requirements on the scrubbing liquid (particularly pH) are similar for oxidation and neutralization, or in a second scrubber placed downstream when said requirements are not compatible.

In the case of nitrogen dioxide, a preferred reaction of neutralization consists in using a scrubbing liquid in which sodium sulfite (which may come from the neutralization of the sulfur dioxide of the fumes) at a pH preferably included between 8.5 and 9, is injected; while the sulfites are oxidized, the nitrogen dioxide is reduced into nitrogen, which avoids the problems of nitrates. In the case of mercury, other physico-chemical reactions of neutralization may be usefully carried out: reactions of complexing by maintaining a chloride ion content greater than 10 g/l (complex $HgCl_4$) or by injecting chelates; or reactions of adsorption on finely divided solids such as active charcoal powder or fly-ash (preferably at a concentration at least equal to 5 g/l).

The releasing agents are for example:
the hydrogen ions whose concentration is defined by the pH of the liquid (preferably acid pH, in the range of 1.5 to 3.5),
the finely divided solids such as fly-ash.

The releasing agents may be introduced (21) in the recycling tank (5) or in the fumes (22) upstream of the scrubber then collected in the scrubber and transferred in the scrubbing liquid (4) or may come from the process emitting the fumes to be purified.

What is claimed is:

1. A method for purifying fumes containing gaseous pollutants including mercury and nitrogen monoxide, by a wet method in a scrubber having an entrance through which the fumes are introduced into the scrubber and wherein at least one dispersing device is disposed in the scrubber, the method comprising:

a) introducing the fumes through the entrance and into the scrubber;

b) dispersing, at a point of dispersion through the at least one dispersing device, a scrubbing liquid into the fumes within the scrubber;

c) collecting the scrubbing liquid from the scrubber and maintaining the scrubbing liquid at a substantially constant acidic pH;

d) bleeding a first portion of the collected scrubbing liquid and separating solids therefrom;

e) recycling a second portion of the collected scrubbing liquid to the at least one dispersing device;

f) injecting into said second portion of the collected scrubbing liquid a compound including an oxidizing agent which will oxidize the pollutants in the fumes including mercury and nitrogen monoxide, said injecting being at a point during recycling of the second portion of the scrubbing liquid such that a time of flow of the second portion of the scrubbing liquid from the point of injection of said compound to the at least one dispersing device allows the oxidizing agent to be released from the compound by reaction of the compound with a releasing agent maintained in the second portion of the scrubbing liquid and such that the release of the oxidizing agent is achieved substantially as the second portion of the scrubbing liquid is dispersed into the scrubber so that consumption of the released oxidizing agent with pollutants other than mercury and nitrogen monoxide present in the second portion of the scrubbing liquid is minimized and such that the oxidizing agent oxidizes the pollutants in the fumes to thereby obtain oxidized pollutants which are soluble in the scrubbing liquid;

g) thereafter, neutralizing the oxidized pollutants in the scrubbing liquid by a physico-chemical reaction downstream of the point of dispersion of the second portion of the scrubbing liquid, said physico-chemical reaction being achieved by introducing a bleed of the second portion of the scrubbing liquid into the scrubber at a point downstream of the at least one dispersing device relative to the entrance into the scrubber, said bleed being obtained upstream of the point of injection of the compound; and h) removing purified fumes from the scrubber.

2. The method of claim 1 wherein the physico-chemical reaction includes the step of complexing oxidized mercury by maintaining in the scrubbing liquid a chloride ion concentration greater than 10 g/l.

3. The method of claim 1 wherein the physico-chemical reaction includes the step of complexing oxidized mercury by injecting a chelate into the scrubbing liquid.

4. The method of claim 1 wherein the physico-chemical reaction includes reactions of adsorption of oxidized mercury on finely divided solids selected from a group consisting of charcoal powder and fly-ash.

5. The method of claim 1 wherein the physico-chemical reaction includes the step of reducing into nitrogen, nitrogen dioxide resulting from the oxidation of the nitrogen monoxide by further injecting a sodium sulfite into the scrubbing liquid.

6. The method of claim 1 wherein said compound is selected from a group of compounds consisting of sodium chlorite, sodium hypochlorite and ozone.

* * * * *